(12) United States Patent
Sasaki et al.

(10) Patent No.: US 8,026,404 B2
(45) Date of Patent: Sep. 27, 2011

(54) METHOD OF MAKING HARMFUL MATERIAL REMEDIATING AGENT AND FOR USING THE SAME

(75) Inventors: Ken-ichi Sasaki, Yokkaichi (JP); Kaoru Sakurai, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 173 days.

(21) Appl. No.: 12/153,939

(22) Filed: May 28, 2008

(65) Prior Publication Data

US 2008/0257834 A1    Oct. 23, 2008

Related U.S. Application Data

(63) Continuation of application No. 10/539,563, filed as application No. PCT/JP03/16257 on Dec. 18, 2003, now abandoned.

(30) Foreign Application Priority Data

Dec. 20, 2002 (JP) .................................. 2002-370564
Dec. 27, 2002 (JP) .................................. 2002-379598

(51) Int. Cl.
*A62D 3/30* (2007.01)

(52) U.S. Cl. .......................... 588/313; 588/400; 588/901
(58) Field of Classification Search .................. 588/313, 588/316, 400, 405, 406, 408, 901; 210/747
See application file for complete search history.

(56) References Cited

U.S. PATENT DOCUMENTS

| 4,792,349 | A  | * | 12/1988 | Trimm et al. ..................... 71/31 |
| 5,266,213 | A  |   | 11/1993 | Gillham |
| 6,242,663 | B1 |   | 6/2001  | Ponder et al. |
| 2002/0115899 | A1 |   | 8/2002  | Stanforth |

FOREIGN PATENT DOCUMENTS

| JP | 3079109      | 6/1991  |
| JP | 7-75772      | 3/1995  |
| JP | 9-70589      | 3/1997  |
| JP | 2000-218262  | 8/2000  |
| JP | 2000-334477  | 12/2000 |
| JP | 2002-161263  | 6/2002  |
| JP | 2002-317202  | 10/2002 |
| JP | 2003-080074  | 3/2003  |

OTHER PUBLICATIONS

Isao Joko, "Environmental Catalyst Handbook" First Ed., NTO Co., Nov. 20, 2001 pp. 134-138.
Manabu Kiyono,"Titanium dioxide, physical properties and applied technology" pp. 65-74.

* cited by examiner

*Primary Examiner* — Edward Johnson
(74) *Attorney, Agent, or Firm* — Paul E. White, Jr.; Manelli Selter PLLC

(57) ABSTRACT

The present invention relates to a harmful material remediating agent comprising a metal oxide and a reducing material, and it can remediate environmental pollutants such as harmful organic compounds and nitrate or nitrite nitrogen-containing compounds efficiently and at low cost.

5 Claims, No Drawings

METHOD OF MAKING HARMFUL MATERIAL REMEDIATING AGENT AND FOR USING THE SAME

This is a continuation application of U.S. application Ser. No. 10/539,563 filed Jun. 17, 2005 now abandoned.

TECHNICAL FIELD

The present invention relates to a harmful material remediating agent which can remediate environmental pollutants such as harmful organic compounds and nitrate and nitrite nitrogen-containing compounds at low cost and high efficiency.

BACKGROUND ART

Highly volatile organic compounds, e.g., halogenated hydrocarbons such as trichloroethylene and tetrachloroethylene, aromatic compounds such as benzene, xylene and toluene, and aldehydes such as acetaldehyde and formaldehyde are industrially widely used as solvents, detergents, etc., and organic agricultural chemicals such as organic chlorine compounds and organic phosphorus compounds are used as insecticides, fungicides and herbicides in agricultural fields. Some of these organic compounds have toxicity or carcinogenicity for men or cause inhibition of growth and induction of malformation for animals and plants, and preparation, use and disposition of them are severely regulated. However, many of the above organic compounds are hardly decomposable, and those which have been abandoned or leaked under no severe control or those which have been used before issuance of regulations, such as DDT and BHC, remain in the environment. These compounds have polluted soil or underground water over a long period of time, and, furthermore, highly volatile matters discharged into atmosphere have polluted the atmosphere, which have caused serious social problems. Furthermore, recently, it has been reported that a part of organic compounds act as so-called endocrine disturbing substances (or environmental hormones) which inhibit generative power of animals and plants.

On the other hand, since nitrate and nitrite nitrogen-containing compounds have carcinogenicity, recently, discharge of them is severely controlled as water pollutants, and chemical industries and fertilizer industries are demanded to cope with the problems. Moreover, in agriculture, organic nitrogen compounds contained in fertilizers produce nitrate and nitrite nitrogen-containing compounds by biodegradation or oxidative decomposition in the fertilized soil, which not only pollute underground water and agricultural waste water, but also cause formation of acidic soil to inhibit rearing of crops. These are also serious problems.

As a method for remediating organic compounds in soil, it has been known to carry out the airlation of soil and collect gaseous components, followed by carrying out reduction decomposition using hydrogen as a reducing agent and platinum or palladium as a catalyst (for example, Isao Joko, "Environmental Catalyst Handbook", (p. 134-138, the first edition, published from NTS Co., on Nov. 20, 2001, hereinafter referred to as "Non-Patent Document 1"). Moreover, there is known a method of directly introducing reducing agent or oxidizing agent into polluted soil to carry out reduction decomposition or oxidation decomposition of organic compounds, which is so-called in-situ remediation method. According to this method, metallic iron (e.g., U.S. Pat. No. 3,079,109 (pages 1-2), hereinafter referred to as "Patent Document 1") or a composite compound of magnetite and metallic iron (e.g., JP-A-2002-317202 (page 1), hereinafter referred to as "Patent Document 2") is used as a reducing agent, and potassium permanganate or hydrogen peroxide (e.g., JP-A-7-75772 (page 1), hereinafter referred to as "Patent Document 3") is used as an oxidizing agent.

For remediating nitrate or nitrite nitrogen-containing compounds in waste water, there are known a method of reducing with hydrogen as in the treatment of the organic compounds, ion exchange method, reverse osmosis method, electrodialysis method, and biodegradation method using bacteria (e.g., pages 89-91 of Non-Patent Document 1). Furthermore, there is known a method of remediating nitrate nitrogen contained in waste water using a solid catalyst containing a metal compound such as titanium oxide or iron oxide and a noble metal catalyst such as platinum, palladium or nickel in the presence of a reducing agent with keeping waste water in liquid phase at a temperature of 120-370° C. under a pressure at which the waste water keeps liquid phase (e.g., JP-A-9-70589 (pages 1-8), hereinafter referred to as "Patent Document 4"). In the case of remediating nitrate or nitrite nitrogen-containing compounds in soil, the above in-situ remediation method is also applied, and metallic iron or sulfide is used as the reducing agent introduced into soil.

DISCLOSURE OF INVENTION

However, the hydrogen reduction method requires too much cost for treatment of organic compounds because a noble metal is used as the catalyst. The so-called in-situ remediation method is low in cost, but the metallic iron disclosed in Patent Document 1 brings about a phenomenon of underground water being colored red, which is called red water, and, moreover, metallic iron or the composite compound disclosed in Patent Document 2 is insufficient in decomposing ability for organic compounds. The oxidizing agent disclosed in Patent Document 3 is too strong in oxidizing power and oxidizes nitrogen compounds and minerals in soil, which causes a problem of changing the properties of soil.

As the method for remediating nitrate or nitrite nitrogen-containing compounds, the hydrogen reduction method requires high cost, the ion exchange method, reverse osmosis method and electrodialysis method remove inorganic ions in water to result in change of water properties, and biodegradation method requires high cost and sometimes adversely affect the ecosystem. The method disclosed in Patent Document 4 uses expensive noble metal catalysts like the hydrogen reduction method and besides carries out the treatment at high temperatures and high pressures. Thus, this method needs a large-scaled apparatus. The in-situ remediation method has the problem of red water caused by metallic iron used as a reducing agent, and sulfides may generate harmful hydrogen sulfide.

As a result of intensive research conducted by the inventors in an attempt to solve these problems, it has been found that a harmful material remediating agent containing a metal having reducibility and a metal oxide has conspicuously high decomposing ability for organic compounds and a harmful material remediating agent containing a reducing material such as reducing agent or metal and a metal oxide has conspicuously high remediating ability for nitrate and nitrite nitrogen-containing compounds even when used under normal pressure, namely, harmful material remediating agents containing a reducing material and a metal oxide are conspicuously high in remediating ability for harmful materials such as organic compounds and nitrate or nitrite nitrogen-containing compounds. Thus, the present invention has been accomplished.

That is, the present invention relates to a harmful material remediating agent comprising a reducing material and a metal oxide.

Furthermore, the present invention relates to a remediating agent for organic compounds harmful to environment which contains a metal having reducibility and a metal oxide.

Moreover, the present invention relates to a remediating agent for nitrate and nitrite nitrogen-containing compounds harmful to environment for using under normal pressure which contains a reducing material and a metal oxide.

In addition, the present invention relates to a method for remediating harmful materials in soil and water which uses the above remediating agent.

The harmful material remediating agent of the present invention, particularly, a remediating agent for organic compounds harmful to environment which contains a metal having reducibility and a metal oxide, is excellent in decomposing ability for harmful organic compounds, a remediating agent for nitrate and nitrite nitrogen-containing compounds harmful to environment for using under normal pressure which contains a reducing material and a metal oxide is excellent in remediating ability for these compounds under normal pressure. These remediating agents hardly cause secondary environmental pollution and soil deterioration, and, furthermore, are low in cost because a reducing material such as a reducing agent or metal and a metal oxide are used.

BEST MODE FOR CARRYING OUT THE INVENTION

The present invention relates to a harmful material remediating agent comprising a reducing material and a metal oxide. It is presumed that the reducing material and the metal oxide used in the present invention are not high in ability for remediating environmental pollutants such as organic compounds and nitrate and nitrite nitrogen-containing compounds when they are singly contacted with environmental pollutants, but when they are used in admixture, the metal oxide exerts a certain catalytic action to develop markedly superior remediating ability. Therefore, the reducing material and metal oxide, each of which alone is low in reaction activity, show high remediating ability when they are used in admixture and give gentle decomposition reaction, and thus it is considered that the nature of soil hardly changes.

The reducing materials used in the present invention are not particularly limited so long as they are non-toxic, and known reducing agents or metals can be used. When the present invention is applied to water treatment, the reducing materials are preferably solid and hardly water-soluble reducing agents or metals since separation of them can be easily performed.

The reducing agents can be used each alone or in admixture of two or more, and may be liquid, solid, gel and the like. Specific examples thereof are metal sulfites, metal hydrogensulfites, metal thiosulfates, metal dithionites, phosphorous acid ($H_2PHO_3$) and metal salts thereof, hypophosphorous acid ($HPH_2O_2$) and metal salts thereof, and the like. The metal sulfites, the metal hydrogensulfites, the metal thiosulfates, the metal dithionites, and the metal salts of phosphorous acid and hypophosphorous acid include, for example, alkali metal salts and alkaline earth metal salts. Among them, sodium sulfite ($Na_2SO_3$), sodium hydrogensulfite ($NaHSO_3$), sodium thiosulfate ($Na_2S_2O_3$), sodium dithionite ($Na_2S_2O_4$), sodium phosphite ($Na_2PHO_3$) and sodium hypophosphite ($NaPH_2O_2$) are high in remediating ability and preferred. As solid and hardly water-soluble reducing agents, mention may be made of sodium sulfite, metal salts of phosphorous acid excluding alkali metal salts, alkaline earth metal salts of hypophosphorous acid, and the like, which are preferred for application to water treatment.

The metals may be those which per se act as reducing agents, and include, for example, iron, aluminum, zinc, copper, magnesium, and the like, and these may be used each alone or in admixture of two or more, or as alloys. The form of the metals is not particularly limited and may be fine powders, particles, small pieces, and the like, and the fine powders are preferred because the area of contact with environmental pollutants to be remediated is larger.

As the metal oxides, there may be used oxides of iron, titanium, aluminum, zinc, manganese, and the like, and these may be used each alone or in admixture of two or more or as composite oxides thereof. Here, the metal oxides include metal hydrated oxides and metal hydroxides in addition to usual metal oxides. The metal oxides may be in any forms of fine powders, particles, small pieces, and the like, and the fine powders are preferred because the area of contact with environmental pollutants to be remediated is larger and the reactivity is high. As the metal oxides, iron oxide and/or titanium oxide are preferred because of their high remediating ability. The iron oxides are compounds represented by the general formula $FeO_x$ ($1 \leq x \leq 1.5$) and include specifically ferrous oxide FeO ($x=1$), ferric oxide $Fe_2O_3$ ($x=1.5$), magnetite $Fe_3O_4$ ($x=1.33$) and hyper-reduced magnetite $FeO_x$ ($1<x<1.33$) and berthollide $FeO_x$ ($1.33<x<1.5$). As the iron oxides, there may also be used those which are obtained by neutralizing waste sulfuric acid containing iron components produced during production of titanium oxide by sulfate process or acid washing of iron materials. The titanium oxides are compounds represented by the general formula $TiO_x$ ($1 \leq x \leq 2$) and include specifically titanium monoxide TiO ($x=1$), dititanium trioxide $Ti_2O_3$ ($x=1.5$), titanium dioxide $TiO_2$ ($x=2$) and titanium oxides having non-stoichiometric composition ($1<x<1.5$ or $1.5<x<2$).

Furthermore, when metal oxides having oxygen at a ratio lower than that calculated from normal valence of the metal component, so-called suboxides, are used in the present invention, the remediating ability is enhanced due to the synergistic effect of the reducibility of the metal suboxides and the reducing material, which is preferred. The suboxides include those of iron, titanium, manganese, and the like. Among them, magnetite, hyper-reduced magnetite, berthollide and titanium oxide having non-stoichiometric composition are preferred metal suboxides because of their superior remediating ability.

In the case of using a metal as the reducing material, this metal and the metal element constituting the metal oxide may be the same or different. The reducing material and the metal oxide may be merely mixed, but in order to improve the operability, they may be formed into particles or pellets with addition of clay minerals such as bentonite, talc and clay as a binder. Furthermore, metal powders can be dispersed in water with addition of optional dispersant or adjustment of pH, followed by mixing with the metal oxide to prepare a slurry. In addition, for the purpose of increasing the effect of the present invention, an adsorbent such as active carbon or zeolite and a reducing agent such as sodium sulfite may be added or an oxidizing agent such as hydrogen peroxide can be added so long as the effect of the present invention is not damaged.

In case a water-soluble solid reducing agent is used as the reducing material, an aqueous solution thereof is mixed with the metal oxide and a slurry prepared from the mixture can be used. In case a hardly water-soluble or water-insoluble solid reducing agent is used, the reducing agent can be dispersed in water with addition of optional dispersant or adjustment of pH, followed by mixing with the metal oxide to prepare a slurry. In addition, for the purpose of increasing the effect of the present invention, an adsorbent such as active carbon or zeolite and a reducing agent such as sodium sulfite may be added or an oxidizing agent such as hydrogen peroxide may be added so long as the effect of the present invention is not damaged.

When the harmful material remediating agent of the present invention is used as a remediating agent for organic compounds harmful to environment, a metal is used as the reducing agent. Particularly, use of metallic iron and iron oxide or metallic iron and titanium oxide as the remediating agent is high in effect and preferred, and use of metallic iron and iron oxide is more preferred. Mixing ratio of the metal and the metal oxide (metal:metal oxide) is preferably 0.02:1-9:1 in weight ratio, and if the ratio of the metal is higher or lower than the above range, the desired effect can hardly be obtained. Particularly, when metallic iron and iron oxide are used, when the mixing ratio is within the above range, production of red water may be prevented although metallic iron is contained. More preferred range is 0.05:1-4:1.

The organic compounds which can be decomposed in the present invention are not particularly limited, and the present invention can also be applied to highly volatile organic compounds, organic agricultural chemicals, dioxin, PCB, non-ylphenol, bisphenol A, 4-nitrotoluene, and the like. The highly volatile organic compounds include, for example, halogenated hydrocarbons such as trichloroethylene, tetrachloroethylene, perchloroethylene, trichloroethane, tetrachloroethane, chlorobenzene, dichloromethane and trichloroethane, aromatic compounds such as benzene, xylene, toluene and acetone, and aldehydes such as acetaldehyde and formaldehyde. The organic agricultural chemicals include, for example, organic chlorine compounds such as DDT, BHC, endrin, dierdrin, aldrin, heptachlor, chlordane, pentachlorobenzyl alcohol, atrazine, hexachlorobenzene, hexachlorocyclohexane, methoxychlor and pentachlorophenol; organic phosphorus compounds such as parathion, TEPP and malathion; carbamate compounds such as methomyl; synthetic pyrethroid compounds such as permethrin; phenoxy compounds such as 2,4-dichlorophenoxyacetic acid and 2,4,5-trichlorophenoxyacetic acid; and dibromochloropropane, tributyltin chloride and 2,4-D. The remediating agents of the present invention have especially high effect on DDT and BHC.

When the remediating agents of the present invention are used for remediation of nitrate and nitrite nitrogen-containing compounds harmful to environment, they can reduce nitrate nitrogen and nitrite nitrogen to harmless nitrogen gas or ammonia even under normal pressure. Either of reducing agent and metal can be used as the reducing material, and when metal is used, use of metallic iron and iron oxide or metallic iron and titanium oxide as the remediating agent is high in effect and preferred, and use of metallic iron and iron oxide is further preferred. In the case of using reducing agent as the reducing material, the mixing ratio of the reducing agent and the metal oxide (reducing agent:metal oxide) is preferably 0.1:1-5:1 in weight ratio, and in the case of using metal as the reducing material, the mixing ratio of the metal and the metal oxide (metal:metal oxide) is preferably 0.001:1-3:1 in weight ratio. If the ratio of each reducing material is higher or lower than the above range, the desired effect can hardly be obtained. Particularly, when metallic iron and iron oxide are used in combination within the above range, generation of red water can be prevented although metallic iron is contained in the remediating agent. More preferred ranges are 0.5:1-2:1 and 0.005:-1-2:1, respectively.

As the nitrate nitrogen-containing compounds which can be remediated by the present invention, mention may be made of ammonium nitrate ($NH_4NO_3$), Chile nitre ($NaNO_3$), calcium nitrate ($Ca(NO_3)_2$), potassium nitrate ($KNO_3$), ammonium sulfate-nitrate (a mixture of $NH_4NO_3$ and $(NH_4)_2SO_4$), Nitro-chalk (a mixture of $NH_4NO_3$ and $CaCO_3$), Calurea ($Ca(NO_3)_2 \cdot 4CO(NH_2)_2$), and compositions containing the above compounds, such as nitrogenous fertilizers, and as nitrite nitrogen-containing compounds, mention may be made of reduction products of the above nitrate nitrogen-containing compounds.

The harmful material remediating agents of the present invention can be used for water treatment and soil treatment by known methods. For example, for water treatment, the remediating agent of the present invention is introduced into various waste waters such as industrial waste water, agricultural waste water and living waste water, and underground water pumped up, followed by stirring to remediate the environmental pollutants such as organic compounds and the nitrate and nitrite nitrogen-containing compounds and then the remediating agents may be filtered off or can be used by supporting on adsorbents such as active carbon and zeolite and packing in a reaction column. The remediated water is recycled into environments such as seas, rivers, lakes and underground water. In the case of remediation of underground water, for example, the present invention can be applied to so-called permeation barrier method according to which a layer containing the remediating agent of the present invention is formed in soil to remediate environmental pollutants contained in the underground water during permeation of the underground water through the layer.

For soil treatment, when environmental pollutants are highly volatile organic compounds, the soil is subjected to deaeration and gaseous components containing the volatilized organic compounds are collected, followed by allowing the gaseous components to contact with the remediating agent. Alternatively, the remediating agent can be applied to the in-situ remediation method by introducing the remediating agent into soil. The in-situ remediation method is especially preferred because it does not need special equipments such as reaction column and can remediate soil at low cost, and can be employed for remediation of, particularly, low volatile organic compounds such as organic agricultural chemicals, PCB and dioxin or nitrate and nitrite nitrogen-containing compounds. The method for introduction into soil is not, particularly limited and can be optionally selected depending on nature of soil and configuration of the ground, and, for example, in the case of solid remediating agent, the soil is dug up and the soil is mixed with the remediating agent, followed by returning the soil or the remediating agent is made to a slurry and poured into soil.

EXAMPLES

The examples of the present invention will be explained below, which do not limit the present invention in any manner.

Examples 1-3

Metallic iron (electrolytic metallic iron powder having an average particle diameter of about 5.0 μm: special grade chemical manufactured by Kanto Kagaku Co., Ltd.) as a reducing material and iron oxide (berthollide ($FeO_{1.447}$) powder having an average particle diameter of about 0.1 μm) as a metal oxide were mixed at a weight ratio of 3:1, 1:1 and 0.33:1 to obtain harmful material remediating agents of the present invention (samples A-C). These are referred to as remediating agents of Examples 1-3.

Examples 4-7

Metallic iron used in Example 1 as a reducing material and iron oxide obtained by neutralizing and oxidizing iron-containing waste sulfuric acid (berthollide ($FeO_{1.39}$) powder having an average particle diameter of about 0.07 μm) as a metal oxide were mixed at a weight ratio of 3:1, 1:1, 0.33:1 and 0.1:1 to obtain harmful material remediating agents of the present invention (samples D-G). These are referred to as remediating agents of Examples 4-7.

Examples 8-10

Sodium hydrogensulfite as a reducing material was mixed with berthollide powder used in Example 1, magnetite powder ($FeO_{1.333}$) having an average particle diameter of about 0.1 μm and titanium oxide powder ($Ti_{1.82}$) having an average particle diameter of about 0.2 μm as metal oxides at a weight ratio of 1:1, respectively, to obtain harmful material remediating agents of the present invention (samples H-J). These are referred to as remediating agents of Examples 8-10.

Examples 11-17

Colloidal metallic iron powder having an average particle diameter of about 0.5 μm as a reducing material and the berthollide powder used in Examples 4-7 as a metal oxide were mixed at a weight ratio of 1:1, 0.2:1, 0.1:1, 0.05:1, 0.03:1, 0.02:1 and 0.01:1 to obtain harmful material remediating agents of the present invention (samples K-Q). These are referred to as remediating agents of Examples 11-17.

Comparative Examples 1-7

The electrolytic metallic iron powder used in Examples 1-7, the berthollide powder used in Examples 1-17, the berthollide powder used in Examples 4-7 and 11-17, the magnetite powder, titanium oxide powder and sodium hydrogensulfite used in Examples 8-10, and the colloidal metallic iron powder used in Examples 11-17 were used as comparative samples. (Samples R-X).
Evaluation 1
Each of the samples A-C, R and S of Examples 1-3 and Comparative Examples 1 and 2 was added to a 3 ppm aqueous trichloroethylene solution in an amount of 25 g/liter and the solution was charged in a vial, which was stoppered tightly, followed by stirring with shaking for 24 hours to carry out the treatment. The concentration of trichloroethylene in the aqueous solution after lapse of 1 day and 7 days from the treatment was measured by GC-MS head space method. Furthermore, color of the aqueous solution after the treatment was visually judged.
The results of the evaluation are shown in Table 1. It was found that when the metallic iron and the iron oxide were used each alone, the decomposing ability for organic compounds was small while the environmental remediating agents of the present invention obtained by mixing them were high in decomposing ability for trichloroethylene and useful as remediating agents for organic compounds harmful to environment and besides they caused no coloration of the aqueous solution after the treatment.

TABLE 1

| Example | Sample | Remediating agent Metallic iron powder: Iron oxide | Concentration of trichloroethylene (ppm) after 1 day | after 7 days | Color of remediated water |
|---|---|---|---|---|---|
| Example 1 | A | 3:1 | 1.8 | 0.8 | Colorless |
| Example 2 | B | 1:1 | 1.5 | 0.0 | " |
| Example 3 | C | 0.33:1 | 1.5 | 0.1 | " |
| Comparative Example 1 | R | 1:0 | 3.0 | 3.0 | Red |
| Comparative Example 2 | S | 0:1 | 2.6 | 3.0 | Colorless |

Evaluation 2
A test solution in an amount of 100 ml was prepared by adding γ-BHC to distilled water so that the concentration of γ-BHC reached 1 ppm. To this test solution was added 10 g of each of samples D-G of Examples 4-7 and samples R and T of Comparative Examples 1 and 3, and the solution was charged in a vial, which was stoppered tightly, followed by stirring with shaking for 24 hours to carry out the treatment. The test solution to which no sample was added was referred to as Comparative Example 8. Then, each of the test solution was charged in a separating funnel of 100 ml and 10 ml of methylene chloride was added thereto, followed by mixing for 10 minutes. Then, the lower layer (methylene chloride layer) was collected and the extract was subjected to spontaneous filtration. To the remaining upper layer (aqueous layer) was further added 10 ml of methylene chloride, followed by mixing for 10 minutes. Then, the lower layer (methylene chloride layer) was collected and the extract was subjected to spontaneous filtration and combined with the first extract. To the resulting extract was added 2 g of anhydrous sodium sulfate to adsorb water for 10 minutes, and, thereafter, anhydrous sodium sulfate was separated by spontaneous filtration. The concentration of BHC contained in the extracted methylene chloride was measured by GC-MS head space method.
The results are shown in Table 2. It was found that the harmful material remediating agents of the present invention were also high in decomposing ability for BHC as remediating agents for organic compounds harmful to environment.

TABLE 2

| Example | Sample | Remediating agent Metallic Iron:Iron oxide | Concentration of BHC (ppm) |
|---|---|---|---|
| Example 4 | D | 3:1 | 0.12 |
| Example 5 | E | 1:1 | Less than measurement limit |
| Example 6 | F | 0.33:1 | Less than measurement limit |
| Example 7 | G | 0.1:1 | 0.07 |
| Comparative Example 1 | R | 1:0 | 0.84 |
| Comparative Example 3 | T | 0:1 | 0.94 |
| Comparative Example 8 | — | —:— | 0.95 |

Evaluation 3
Each of the samples (H-J, S, U-W) obtained in Examples 8-10 and Comparative Examples 2 and 4-6 was added in an amount of 150 g/liter to an aqueous potassium nitrate solution of 10 ppm in concentration and charged in a vial, which was stoppered tightly, followed by stirring with shaking for 24 hours to carry out the treatment. The concentration of nitrate ion contained in the aqueous solution after the treatment was measured by ion chromatograph method. Since the decomposition reaction of nitrate ion is affected by pH, some of the samples were optionally adjusted to pH 6.5-7.5 before the treatment. For example, in Example 8, pH was adjusted using an aqueous sodium hydroxide solution.

The results of the evaluation are shown in Table 3. It was found that when the metal oxide and the reducing agent were used each alone, the decomposing ability for nitrate ion was small while the harmful material remediating agents of the present invention obtained by mixing them were high in decomposing ability for nitrate ion even under normal pressure and useful as remediating agents for nitrate nitrogen-containing compounds harmful to environment.

TABLE 3

| Example | Sample | Remediating agent | Concentration of nitrate ion (ppm) |
|---|---|---|---|
| Example 8 | H | Sodium hydrogensulfite + Berthollide | 0.1 or less |
| Example 9 | I | Sodium hydrogensulfite + Magnetite | 0.1 or less |
| Example 10 | J | Sodium hydrogensulfite + Titanium oxide | 0.1 or less |
| Comparative Example 2 | S | Berthollide | 9.8 |
| Comparative Example 4 | U | Magnetite | 9.6 |
| Comparative Example 5 | V | Titanium oxide | 9.0 |
| Comparative Example 6 | W | Sodium hydrogensulfite | 10.0 |

Evaluation 4

Each of the samples (K-Q, T, X) obtained in Examples 11-17 and Comparative Examples 3 and 7 was added in an amount of 100 g/liter to an aqueous potassium nitrate solution of 230 ppm in concentration of nitrate ion. The solution to which no remediating agent was added is referred to as Comparative Example 9. These were remediated in the same manner as in evaluation 3, and the nitrate ion concentration was measured and simultaneously ammonium ion concentration was also measured. Conversion rate to ammonia was calculated from the formula: {concentration of ammonium ion in terms of nitrogen (ppm)/52 (concentration of nitrate ion in terms of nitrogen in Comparative Example 9: ppm)}×100. Furthermore, color of the aqueous solution after treatment was visually judged.

The results of the evaluation are shown in Table 4. It was found that the harmful material remediating agents of the present invention obtained by mixing the metal oxide and the metallic iron were high in decomposing ability for nitrate ion even under normal pressure and the remediated nitrate ion was efficiently converted to harmless ammonium ion when they were used as remediating agents for nitrate nitrogen-containing compounds harmful to environment. It was also found that the aqueous solution was not colored even after the treatment.

TABLE 4

| Example | Sample | Remediating agent Metallic iron powder: Iron oxide | Concentration of nitrate ion (ppm) | Concentration of ammonium ion (ppm) | Concentration of ammonium ion in terms of nitrogen (ppm) | Conversion rate (%) | Color of remediated water |
|---|---|---|---|---|---|---|---|
| Example 11 | K | 1:1 | 47 | 31 | 25 | 48 | Colorless |
| Example 12 | L | 0.2:1 | 0 | 44 | 36 | 69 | " |
| Example 13 | M | 0.1:1 | 0 | 52 | 43 | 83 | " |
| Example 14 | N | 0.05:1 | 2 | 56 | 46 | 89 | " |
| Example 15 | O | 0.03:1 | 1 | 50 | 41 | 79 | " |
| Example 16 | P | 0.02:1 | 2 | 47 | 39 | 75 | " |
| Example 17 | Q | 0.01:1 | 46 | 43 | 36 | 69 | " |
| Comparative Example 3 | T | 0:1 | 230 | 1 | 1 | 2 | " |
| Comparative Example 7 | X | 1:0 | 182 | 16 | 13 | 25 | Red |
| Comparative Example 9 | — | 0:0 | 230 | 0 | 0 | 0 | Colorless |

Evaluation 5

The remediating agent (sample M) obtained in Example 13 was added in an amount of 100 g/liter to a polluted water containing a nitrate and nitrite nitrogen-containing compound and the polluted water was charged in a vial, which was stoppered tightly, followed by stirring with shaking for 24 hours to carry out the treatment. The polluted water to which the remediating agent was not added is referred to as Comparative Example 10. The concentration of nitrate ion and nitrite ion contained in the aqueous solution after the treatment were measured by ion chromatograph method.

The results of the evaluation are shown in Table 5. It was found that the harmful material remediating agent of the present invention was also useful as a remediating agent for nitrite nitrogen-containing compound.

TABLE 5

| | Sample | Metallic iron powder:Iron oxide | Concentration of nitrate ion (ppm) | Concentration of nitrite ion (ppm) |
|---|---|---|---|---|
| Example 13 | M | 0.1:1 | 0 | 0.1 or less |
| Comparative Example 10 | — | 0:0 | 162 | 0.8 |

INDUSTRIAL APPLICABILITY

The present invention is useful for remediation of underground water or soil containing harmful organic compounds or nitrate and nitrite nitrogen-containing compounds.

The invention claimed is:

1. A process for producing an organic compound decomposing agent which comprises:
   obtaining a fine particle iron suboxide by neutralizing waste sulfuric acid which contains iron compounds, wherein said iron suboxide is berthollide, and
   admixturing the fine particle iron suboxide with a fine particle iron.

2. A process for producing an organic compound decomposing agent according to claim 1, wherein the iron suboxide is at least one iron suboxide selected from the group consisting of magnetite, hyper-reduced magnetite and berthollide.

3. A process for producing an organic compound decomposing agent according to claim 1, wherein the mixing ratio of the ion and the iron suboxide is in the range of 0.02:1-9:1 in weight ratio.

4. A method for decomposing organic compounds which comprises:
   producing an organic compound decomposing agent by the process of claim 1, and
   introducing the organic compound decomposing agent into soil to decompose the organic compounds in the soil.

5. A method for decomposing organic compounds which comprises:
   producing an organic compound decomposing agent by the process of claim 1,
   introducing the organic decomposing agent into water to decompose the organic compounds in the water, and
   separating the organic compound decomposing agent by solid-liquid separation.

* * * * *